United States Patent
Kawashima

(10) Patent No.: US 10,069,370 B2
(45) Date of Patent: Sep. 4, 2018

(54) SEAL OIL SUPPLY DEVICE FOR DYNAMO-ELECTRIC MACHINE AND SEAL OIL SUPPLY METHOD

(71) Applicant: Mitsubishi Electric Corporation, Chiyoda-ku, Tokyo (JP)

(72) Inventor: Koji Kawashima, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/303,701

(22) PCT Filed: Jun. 5, 2014

(86) PCT No.: PCT/JP2014/064936
§ 371 (c)(1),
(2) Date: Oct. 12, 2016

(87) PCT Pub. No.: WO2015/186221
PCT Pub. Date: Dec. 10, 2015

(65) Prior Publication Data
US 2017/0040862 A1     Feb. 9, 2017

(51) Int. Cl.
*H02K 5/124*    (2006.01)
*F16J 15/40*    (2006.01)

(52) U.S. Cl.
CPC .............. *H02K 5/124* (2013.01); *F16J 15/40* (2013.01); *F16J 15/406* (2013.01)

(58) Field of Classification Search
CPC ........... H02K 5/124; F16J 15/40; F16J 15/406
See application file for complete search history.

(56) References Cited

U.S. PATENT DOCUMENTS 3,176,996 A * 4/1965 Barnett .................. B63H 23/36
                                                                                                                                                                                                                                                  277/318
4,005,580 A * 2/1977 Swearingen ............ F01D 11/04
                                                                                                                                                                                                                                                   184/6

(Continued)

FOREIGN PATENT DOCUMENTS

JP       S 62145462 U      9/1987
JP       S64-045472 U      3/1989

(Continued)

OTHER PUBLICATIONS

International Search Report (PCT/ISA/210) dated Aug. 19, 2014, by the Japanese Patent Office as the International Searching Authority for International Application No. PCT/JP2014/064936.

(Continued)

*Primary Examiner* — William E Dondero
*Assistant Examiner* — Robert T Reese
(74) *Attorney, Agent, or Firm* — Buchanan Ingersoll & Rooney PC

(57) ABSTRACT

The present invention achieves oil amount reduction and size reduction in a seal oil supply device for rotating electric machine by suppressing expansion of a rotary shaft due to its temperature increase and reducing the gap between the rotary shaft and a seal ring in normal operation. In this seal oil supply device for rotating electric machine, seal oil is supplied from a seal oil pump to a seal ring of a rotating electric machine in which hydrogen gas is sealed, via a differential pressure regulation valve for regulating a pressure of the seal oil. A first route is provided for supplying the seal oil from the seal oil pump via the differential pressure regulation valve, and in addition, a second route is provided for supplying the seal oil from the seal oil pump via a relief valve.

7 Claims, 4 Drawing Sheets

(56) References Cited

U.S. PATENT DOCUMENTS

| | | | | |
|---|---|---|---|---|
| 4,029,323 A | * | 6/1977 | Inoue | F16C 32/0651 |
| | | | | 277/431 |
| 4,058,320 A | * | 11/1977 | Kosanovich | F16J 15/40 |
| | | | | 277/317 |
| 4,969,796 A | | 11/1990 | Wescott et al. | |
| 5,593,163 A | | 1/1997 | Daiber et al. | |
| 6,116,609 A | * | 9/2000 | Azibert | F16J 15/3488 |
| | | | | 277/388 |

FOREIGN PATENT DOCUMENTS

| | | |
|---|---|---|
| JP | S64-45472 U | 3/1989 |
| JP | H03-15411 82 | 3/1991 |
| JP | H03-155350 A | 7/1991 |
| JP | H09-065600 A | 3/1997 |
| JP | 2001-028867 A | 1/2001 |
| JP | 2004-007876 A | 1/2004 |
| JP | 2006-230062 A | 8/2006 |

OTHER PUBLICATIONS

Office Action (Reasons) dated Feb. 7, 2017, by the Japanese Patent Office in Japanese Patent Application No. 2016-525629, and an English Translation of the Office Action. (6 pages).

\* cited by examiner

SEAL OIL SUPPLY DEVICE FOR DYNAMO-ELECTRIC MACHINE AND SEAL OIL SUPPLY METHOD

TECHNICAL FIELD

The present invention relates to a seal oil supply device and a seal oil supply method for a rotating electric machine using hydrogen gas or the like as a cooling medium.

BACKGROUND ART

In a conventional hydrogen-cooled turbine generator, a heated part such as a coil is cooled by hydrogen gas sealed in the machine, a seal ring is provided for preventing leakage of the hydrogen gas to the atmosphere through a shaft penetrating portion, and seal oil is supplied to the seal ring to seal the hydrogen gas.

In the conventional seal oil supply device of this type, a differential pressure between the oil supply pressure at which the oil is supplied to the seal ring and the gas pressure inside the machine is controlled by a differential pressure regulation valve, but the absolute pressure of the oil supply itself is not directly controlled (see Patent Document 1).

CITATION LIST

Patent Document

Patent Document 1: Japanese Examined Patent Publication No. 3-15411

SUMMARY OF THE INVENTION

Problems To Be Solved By The Invention

Thus, a sufficient oil supply pressure is ensured during normal operation, but when operation is performed at an extremely low pressure close to a gas pressure of 0.00 MPa-g, e.g., at the time of test operation, the oil supply pressure decreases, the pressure difference between the oil supply pressure for the seal ring and the atmospheric pressure decreases, and the machine-outer-side flow in the seal ring decreases.

If the flow decreases, the temperature of a rotary shaft increases and the rotary shaft expands, whereby the gap between the rotary shaft and the seal ring becomes small.

In the conventional seal ring, the gap between the rotary shaft and the seal ring is designed so that a sufficient gap is ensured at this time.

Therefore, during normal operation in which a sufficient pressure is ensured, the gap becomes larger than necessary and the oil amount increases, resulting in a problem that the sizes of components of the seal oil supply device for rotating electric machine increase more than necessary.

The present invention has been made to solve the above problem, and an object of the present invention is to provide a seal oil supply device for rotating electric machine with a reduced oil amount and a reduced size in which a necessary oil supply pressure is ensured even when operation is performed at an extremely low pressure close to a gas pressure of 0.00 MPa-g, e.g., at the time of test operation, thereby suppressing expansion of a rotary shaft due to its temperature increase and reducing the gap between the rotary shaft and a seal ring during normal operation.

Solution to the Problems

In a seal oil supply device for rotating electric machine according to the present invention, seal oil is supplied from a seal oil pump to a seal ring of a rotating electric machine in which hydrogen gas is sealed, via a differential pressure regulation valve for regulating a pressure of the seal oil. The differential pressure regulation valve allows passage of the seal oil controlled to have a pressure higher by a certain value than a pressure of the hydrogen gas inside the rotating electric machine. The seal oil supply device for rotating electric machine includes: a first route for supplying the seal oil from the seal oil pump via the differential pressure regulation valve; and a second route for supplying the seal oil from the seal oil pump via a relief valve having a setting pressure adjusted to be equal to or higher than a minimum oil supply pressure.

In a seal oil supply method for rotating electric machine according to the present invention, seal oil is supplied from a seal oil pump to a seal ring of a rotating electric machine in which hydrogen gas is sealed, via a differential pressure regulation valve for regulating a pressure of the seal oil. The seal oil supply method includes: supplying the seal oil controlled to have a pressure higher by a certain value than a pressure of the hydrogen gas inside the rotating electric machine, through a first route from the seal oil pump via the differential pressure regulation valve, during normal operation of the rotating electric machine; and supplying the seal oil through a second route from the seal oil pump via a relief valve having a setting pressure adjusted to be equal to or higher than a minimum oil supply pressure, when the rotating electric machine is operated with a pressure of the hydrogen gas being an extremely low pressure close to 0.00 MPa-g.

Effect of the Invention

According to the present invention, a necessary oil supply pressure is ensured even when operation is performed at an extremely low pressure close to a gas pressure of 0.00 MPa-g, e.g., at the time of test operation, thereby suppressing expansion of a rotary shaft due to its temperature increase and reducing the gap between the rotary shaft and a seal ring during normal operation. Thus, oil amount reduction and size reduction in the seal oil supply device for rotating electric machine can be achieved.

DESCRIPTION OF EMBODIMENTS

Embodiment 1

Hereinafter, embodiment 1 of the present invention will be described on the basis of the drawings.

Figure 1:
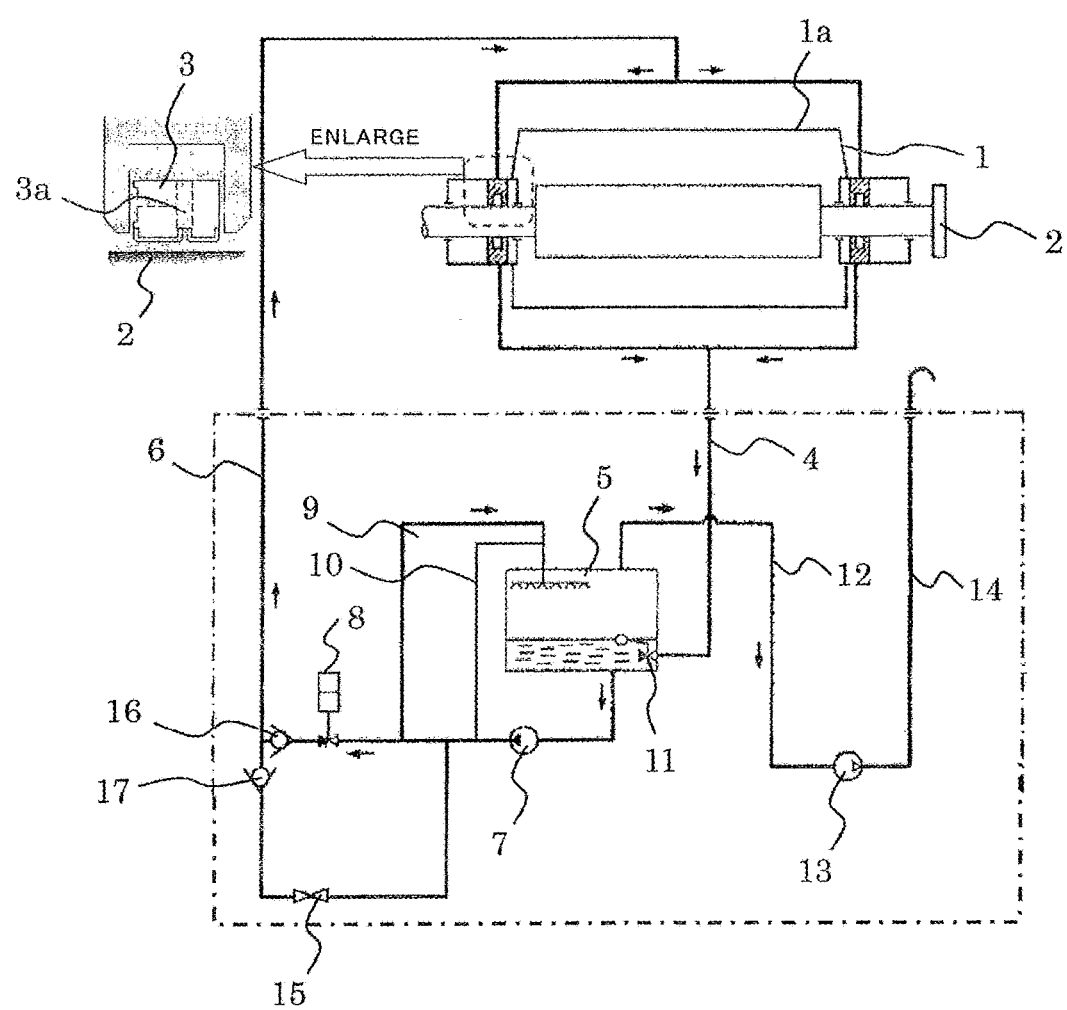
FIG. 1 is a system diagram showing a seal oil supply device for rotating electric machine according to embodiment 1 of the present invention.

FIG. 1 is a system diagram showing a seal oil supply device for rotating electric machine according to embodiment 1 of the present invention, and also shows a rotating electric machine together.

The rotating electric machine is, for example, a turbine generator of hydrogen-cooled type.

In FIG. 1, the rotating electric machine 1 includes: a rotary shaft 2 penetrating a sealed chamber 1a in which hydrogen gas is sealed; and a seal ring 3 which is provided in each bearing chamber provided at both ends in the axial direction and which is a shaft sealing portion for sealing the gap between the sealed chamber 1a and the rotary shaft 2 of the rotating electric machine 1, using seal oil.

Seal oil discharged from the seal ring 3 is sent via a seal oil discharge tube 4 to a vacuum tank 5 for vacuum-deaerating the seal oil. The upstream side of the seal ring 3 and the vacuum tank 5 are connected to each other via a seal oil supply tube 6 for supplying seal oil to the seal ring 3.

A seal oil pump 7 for supplying seal oil stored in the vacuum tank 5 to the seal ring 3, and a differential pressure regulation valve 8 for regulating the pressure of the seal oil supplied to the seal ring 3, are attached to the seal oil supply tube 6.

The differential pressure regulation valve 8 allows passage of the seal oil controlled to have a pressure higher by a certain value than the hydrogen gas pressure inside the rotating electric machine 1.

One end side of a seal oil return tube 9 for returning, to the vacuum tank 5, the seal oil that cannot pass through the differential pressure regulation valve 8, is connected to the seal oil supply tube 6 between the seal oil pump 7 and the differential pressure regulation valve 8. The other end side of the seal oil return tube 9 leads into the vacuum tank 5 and is connected to an ejection nozzle.

An oil level regulation valve 11 for keeping the level of the seal oil constant is attached to the vacuum tank 5.

The vacuum tank 5 is provided with a gas discharge tube 12 for discharging gas containing air, an oil component, moisture, hydrogen, etc., and the gas discharge tube 12 is connected to a vacuum pump 13. The gas is discharged from the vacuum pump 13 via an ejection tube 14 to the outside.

In the present embodiment 1, on the downstream side of the seal oil pump 7, a relief valve 15 having a setting pressure of, for example, 0.1 to 0.2 MPa-g is provided in parallel with the differential pressure regulation valve 8.

Thus, a first route for supplying the seal oil from the seal oil pump 7 via the differential pressure regulation valve 8 is formed, and in addition, a second route for supplying the seal oil from the seal oil pump 7 via the relief valve 15 is formed.

One end side of a seal oil return tube 10 for returning, to the vacuum tank 5, the seal oil that cannot pass through the relief valve 15, is connected between the seal oil pump 7 and the relief valve 15.

Check valves 16 and 17 are provided on the downstream side of the differential pressure regulation valve 8 and the downstream side of the relief valve 15, respectively.

In the seal ring 3, as shown in an enlarged sectional view thereof in FIG. 1, seal oil is supplied from the seal oil supply tube 6 via an oil supply hole 3a, to form an oil film between the seal ring 3 and the rotary shaft 2, thereby preventing hydrogen gas sealed in the rotating electric machine 1 from leaking to the outside.

Next, the operation will be described.

The hydrogen gas in the rotating electric machine 1 is sealed by the seal oil which circulates through the seal oil supply circuit connected to the seal ring 3 as shown in FIG. 1.

The seal oil is fed by the seal oil pump 7 and is regulated by the differential pressure regulation valve 8 so as to have a pressure higher by a certain value than that of the hydrogen gas in the rotating electric machine 1.

The regulated seal oil passes through the seal oil supply tube 6 and is sent to the seal ring 3. At the seal ring 3, the seal oil is exposed to the outside air to contain air, moisture, hydrogen gas, etc. Then, the seal oil is retrieved to the vacuum tank 5 through the seal oil discharge tube 4, and vacuum-deaerated in the vacuum tank 5.

The deaeration air obtained by deaeration in the vacuum tank 5 is sent through the gas discharge tube 12 to the vacuum pump 13, and then ejected through the ejection tube 14 to the outside.

In normal operation of the rotating electric machine 1 (in which the machine internal gas pressure is about 0.2 to 0.6 MPa-g), seal oil that passes through the first route from the seal oil pump 7 via the differential pressure regulation valve 8 is regulated by the differential pressure regulation valve 8 so that the pressure of the seal oil becomes gas pressure+ differential pressure (about 0.05 to 0.10 MPa-g), and then the seal oil is supplied to the seal ring 3 through the oil supply tube 6.

On the other hand, when the operation is performed at an extremely low pressure close to a gas pressure of 0.00 MPa-g, e.g., at the time of test operation, seal oil is supplied through the second route from the seal oil pump 7 via the relief valve 15, and since the setting pressure (0.1 to 0.2 MPa-g) of the relief valve 15 in the second route is greater than the pressure (machine-inside gas pressure+differential pressure) regulated by the differential pressure regulation valve 8 in the first route, the oil having the setting pressure of the relief valve 15 is supplied to the seal ring 3.

Figure 2:
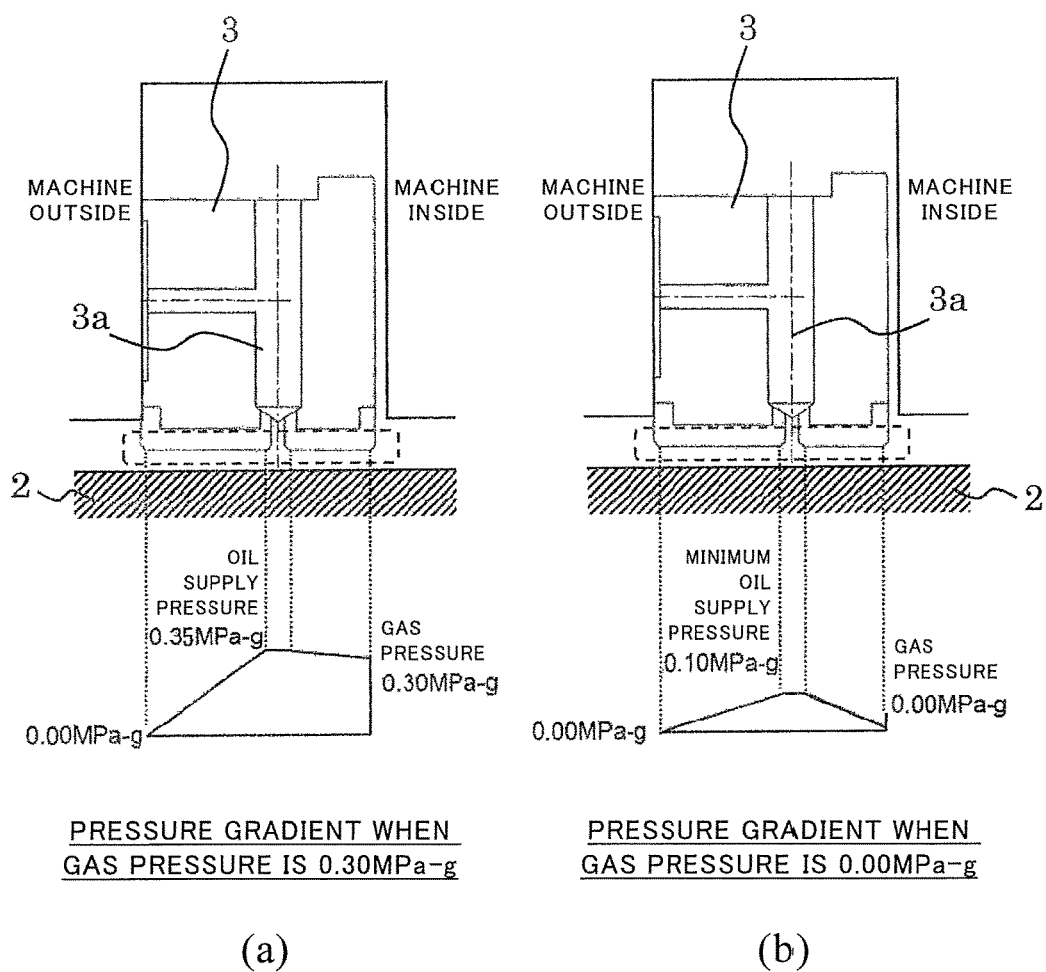
FIG. 2 is a diagram illustrating a pressure distribution in a seal ring in embodiment 1 of the present invention.

FIG. 2 is a diagram illustrating a pressure distribution around the seal ring 3 in embodiment 1, in which (a) shows the pressure gradient of seal oil when the gas pressure is 0.30 MPa-g, and (b) shows the pressure gradient of seal oil when the gas pressure is 0.00 MPa-g.

By adopting the present invention, as shown in FIG. 2(b), even in the case of extremely low pressure close to a gas pressure of 0.00 MPa-g, e.g., at the time of test operation, the minimum oil supply pressure of 0.10 MPa-g is ensured, and thus a machine-outer-side pressure gradient that is equal to or greater than a certain gradient is ensured.

Therefore, even when the operation is performed at an extremely low pressure close to a gas pressure of 0.00 MPa-g, e.g., at the time of test operation, expansion of the rotary shaft 2 due to its temperature increase is suppressed, and the gap between the rotary shaft 2 and the seal ring 3 during normal operation can be designed to be small.

Figure 3:
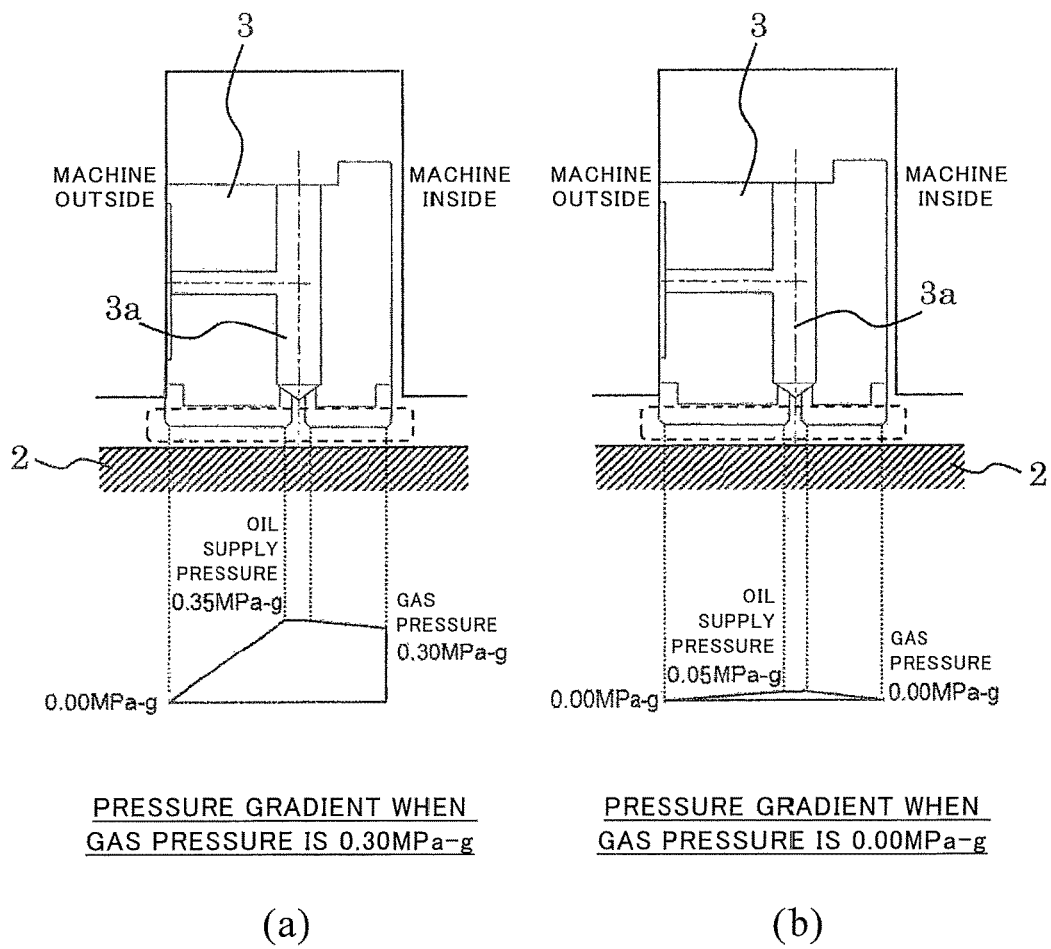
FIG. 3 is a diagram illustrating a pressure distribution in a seal ring in a conventional apparatus.

On the other hand, FIG. 3 is a diagram illustrating a pressure distribution around the seal ring 3 in a conventional apparatus, in which (a) shows the pressure gradient of seal oil when the gas pressure is 0.30 MPa-g, and (b) shows the pressure gradient of seal oil when the gas pressure is 0.00 MPa-g.

If the present invention is not adopted, in the case of extremely low pressure close to a gas pressure of 0.00 MPa-g, e.g., at the time of test operation, as shown in FIG. 3(b), the machine-inner-side pressure gradient is the same as that in the case of gas pressure of 0.30 MPa-g, but the machine-outer-side pressure gradient is smaller than that in the case of gas pressure of 0.30 MPa-g.

Therefore, in order to ensure the seal oil amount for this case, it is necessary to enlarge the gap between the rotary shaft 2 and the seal ring 3.

In FIGS. 2 and 3, part enclosed by a dotted line between the rotary shaft 2 and the seal ring 3 indicates a region where an oil film is formed by the seal oil.

As described above, in the seal oil supply device for rotating electric machine of embodiment 1, seal oil is supplied from the seal oil pump 7 to the seal ring 3 of the rotating electric machine 1 in which hydrogen gas is sealed, via the differential pressure regulation valve 8 for regulating the pressure of the seal oil. The seal oil supply device for rotating electric machine has the first route for supplying the seal oil from the seal oil pump 7 via the differential pressure regulation valve 8, and in addition, has the second route for supplying the seal oil from the seal oil pump 7 via the relief valve 15. Thus, even when the operation is performed at an extremely low pressure close to a gas pressure of 0.00 MPa-g, e.g., at the time of test operation, a necessary oil supply pressure is ensured to suppress expansion of the rotary shaft 2 due to its temperature increase. As a result, the gap between the rotary shaft 2 and the seal ring 3 during normal operation can be designed to be small, whereby oil amount reduction and size reduction can be achieved.

Embodiment 2

Figure 4:
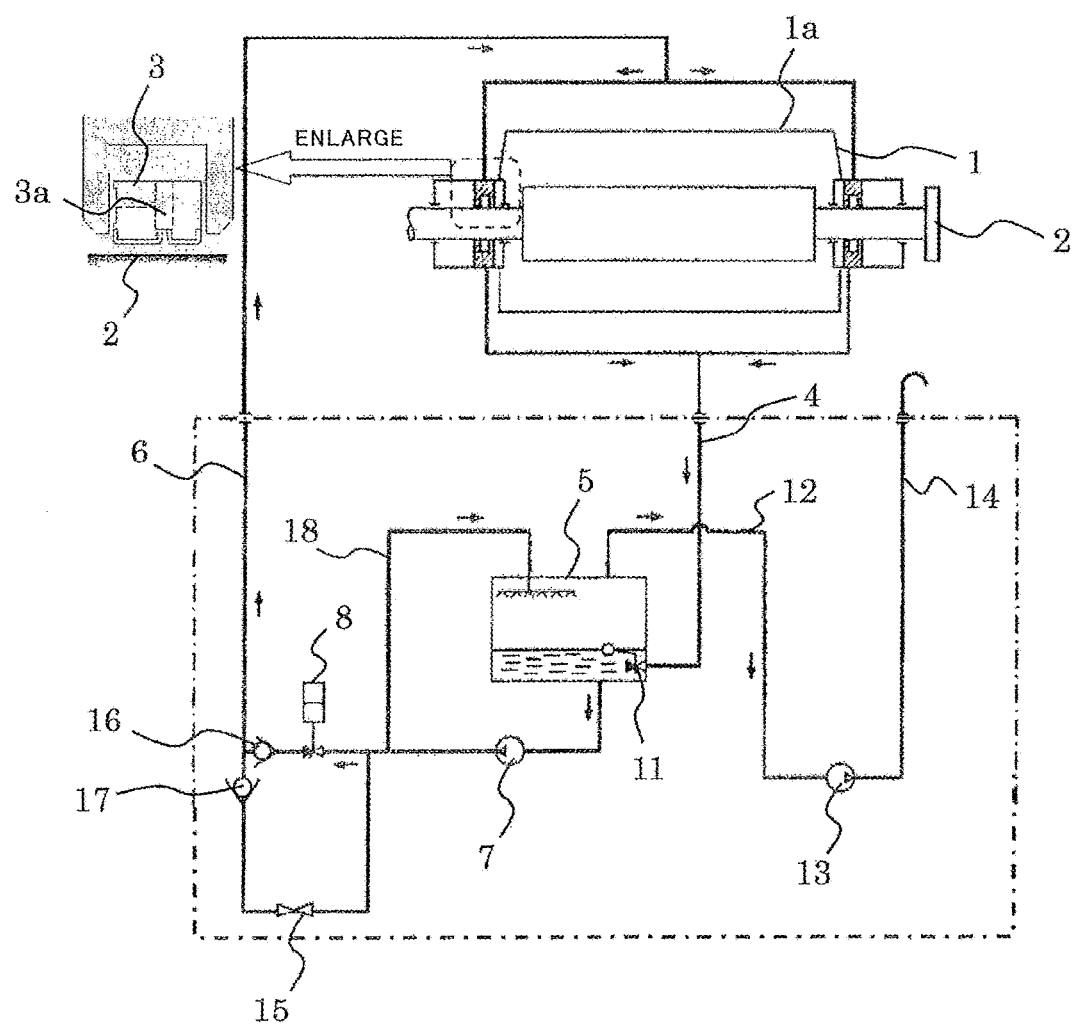
FIG. 4 is a system diagram showing a seal oil supply device for rotating electric machine according to embodiment 2 of the present invention.

In the above embodiment 1, the return oils from the differential pressure regulation valve 8 and the relief valve 15 are returned to the vacuum tank 5 via separate seal oil return tubes 9 and 10, respectively. However, as shown in FIG. 4, the return oil from the differential pressure regulation valve 8 and the return oil from the relief valve 15 may be returned to the vacuum tank 5 through the same seal oil return tube 18.

In this configuration, the number of necessary seal oil return tubes decreases to one, and thus there is an advantage that the configuration is simplified.

It is noted that, within the scope of the present invention, the above embodiments may be freely combined with each other, or each of the above embodiments may be modified or simplified as appropriate.

DESCRIPTION OF THE REFERENCE CHARACTERS 1 rotating electric machine
1a sealed chamber
2 rotary shaft
3 seal ring
4 seal oil discharge tube
5 vacuum tank
6 seal oil supply tube
7 seal oil pump
8 differential pressure regulation valve
9 seal oil return tube
10 seal oil return tube
11 oil level regulation valve
12 gas discharge tube
13 vacuum pump
14 ejection tube
15 relief valve
16 check valve
17 check valve
18 seal oil return tube

The invention claimed is:

1. A seal oil supply device for rotating electric machine, in which seal oil is supplied from a seal oil pump to a seal ring of a rotating electric machine in which hydrogen gas is sealed, via a differential pressure regulation valve for regulating a pressure of the seal oil, wherein
the differential pressure regulation valve allows passage of the seal oil controlled to have a first pressure higher by a certain value than a pressure of the hydrogen gas inside the rotating electric machine,
the seal oil supply device comprising:
a first route for supplying the seal oil from the seal oil pump to the seal ring via the differential pressure regulation valve; and
a second route for supplying the seal oil from the seal oil pump to the seal ring via a relief valve configured to have a second pressure adjusted to be equal to or higher than a minimum oil supply pressure wherein the first pressure is different from the second pressure.

2. The seal oil supply device for rotating electric machine according to claim 1, wherein
the second pressure of the relief valve is set at 0.1 to 0.2 MPa-g.

3. The seal oil supply device for rotating electric machine according to claim 1, wherein
the second route is provided in parallel with the first route, and
in the first route and the second route, check valves are respectively provided before a location where the first route and the second route join together.

4. The seal oil supply device for rotating electric machine according to any one of claim 1, wherein
return oil from the differential pressure regulation valve and return oil from the relief valve are returned to a vacuum tank through the same seal oil return tube.

5. A seal oil supply method for rotating electric machine, in which seal oil is supplied from a seal oil pump to a seal ring of a rotating electric machine in which hydrogen gas is sealed, via a differential pressure regulation valve for regulating a pressure of the seal oil, the seal oil supply method comprising:
supplying the seal oil controlled to have a first pressure higher by a certain value than a pressure of the hydrogen gas inside the rotating electric machine, through a first route from the seal oil pump to the seal ring via the differential pressure regulation valve, during normal operation of the rotating electric machine; and
supplying the seal oil through a second route from the seal oil pump to the seal ring via a relief valve having a second pressure adjusted to be equal to or higher than a minimum oil supply pressure, when the rotating electric machine is operated with a pressure of the hydrogen gas being an extremely low pressure close to 0.00 MPa-g and wherein the first pressure is different from the second pressure.

6. The seal oil supply method for rotating electric machine according to claim 5, wherein
the second pressure of the relief valve is set at 0.1 to 0.2 MPa-g.

7. A seal oil supply device for rotating electric machine, in which seal oil is supplied from a seal oil pump to a seal ring of a rotating electric machine in which hydrogen gas is sealed, via a differential pressure regulation valve for regulating a pressure of the seal oil, wherein
the differential pressure regulation valve allows passage of the seal oil controlled to have a pressure higher by a certain value than a pressure of the hydrogen gas inside the rotating electric machine,
the seal oil supply device comprising:
a first route for supplying the seal oil from the seal oil pump to the seal ring via the differential pressure regulation valve; and
a second route for supplying the seal oil from the seal oil pump to the seal ring via a relief valve having a setting pressure adjusted to be equal to or higher than a minimum oil supply pressure, wherein the second route is provided in parallel with the first route, and in the first route and the second route, check valves are respectively provided before a location where the first route and the second route join together.

* * * * *